US006483845B1

(12) United States Patent
Takeda et al.

(10) Patent No.: US 6,483,845 B1

(45) Date of Patent: Nov. 19, 2002

(54) PACKET TRANSMITTER-RECEIVER AND PACKET RECEIVER

(75) Inventors: Hidetoshi Takeda, Neyagawa (JP); Makoto Asano, Vienna (AT)

(73) Assignees: Matsushita Electric Industrial Co., Ltd., Osaka (JP); Koninklijke Philips Electronics N.V., BA Bandhoven (NL)

( * ) Notice: Subject to any disclaimer, the term of this patent is extended or adjusted under 35 U.S.C. 154(b) by 0 days.

(21) Appl. No.: 09/077,065

(22) PCT Filed: Sep. 16, 1997

(86) PCT No.: PCT/JP97/03250

§ 371 (c)(1), (2), (4) Date: Feb. 8, 1999

(87) PCT Pub. No.: WO98/12844

PCT Pub. Date: Mar. 26, 1998

(30) Foreign Application Priority Data

Sep. 17, 1996 (JP) ............................................. 8-244716

(51) Int. Cl.[7] ............................................... H04L 12/54

(52) U.S. Cl. ........................ 370/429; 370/389; 370/412; 714/748

(58) Field of Search ................................ 370/230, 231, 370/235, 242, 243, 244, 249, 389, 412, 428, 429; 714/746, 748, 749, 750

(56) References Cited

U.S. PATENT DOCUMENTS

| | | | | | |
|---|---|---|---|---|---|
| 4,495,570 | A | * | 1/1985 | Kitajima et al. | 709/105 |
| 5,056,058 | A | * | 10/1991 | Hirata et al. | 709/230 |
| 5,224,095 | A | * | 6/1993 | Woest et al. | 370/401 |
| 5,335,357 | A | * | 8/1994 | Fennell et al. | 455/503 |
| 5,377,188 | A | * | 12/1994 | Seki | 370/390 |
| 5,477,216 | A | * | 12/1995 | Lee, Jr. et al. | 340/870.02 |
| 5,546,391 | A | * | 8/1996 | Hochschild et al. | 370/413 |
| 5,664,220 | A | * | 9/1997 | Itoh et al. | 710/6 |
| 5,678,060 | A | * | 10/1997 | Yokoyama et al. | 709/212 |
| 5,701,302 | A | * | 12/1997 | Geiger | 370/521 |
| 5,712,624 | A | * | 1/1998 | Ayerst et al. | 340/825.21 |
| 5,758,087 | A | * | 5/1998 | Asker et al. | 709/232 |
| 5,761,490 | A | * | 6/1998 | Hunt | 712/213 |
| 5,778,419 | A | * | 7/1998 | Hansen et al. | 711/112 |
| 5,845,145 | A | * | 12/1998 | James et al. | 395/821 |
| 5,881,055 | A | * | 3/1999 | Kondo | 370/311 |
| 6,031,830 | A | * | 2/2000 | Cowan | 370/338 |
| 6,088,591 | A | | 7/2000 | Trompower et al. | 455/438 |
| 6,138,019 | A | * | 10/2000 | Trompower et al. | 455/436 |

FOREIGN PATENT DOCUMENTS

| | | |
|---|---|---|
| JP | 2-111133 | 4/1990 |
| JP | 3-117242 | 5/1991 |
| JP | 3-136535 | 6/1991 |
| JP | 7-30502 | 1/1995 |

OTHER PUBLICATIONS

IEEE Standard for a High Performance Serial Bus, IEEE Computer Society, published by the Institute of Electrical and Electronics Engineers, Inc., New York, NY, Aug. 30, 1996.

Japanese language search report for Int'l Appln. No. PCT/JP97/03250 dated Jan. 20, 1998.

English translation of Japanese language search report.

* cited by examiner

*Primary Examiner*—Hassan Kizou

*Assistant Examiner*—Saba Tsegaye

(74) *Attorney, Agent, or Firm*—RatnerPrestia

(57) ABSTRACT

Disclosed is a packet transmitting/receiving apparatus that receives a response packet to a transmitted request packet without fail. When a request packet is transmitted by a packet transmitter, a prediction of a response packet is made in reply to the transmitted request packet. When the response packet is received from a transmission medium, a comparator compares a portion of the packet received by a receiver with a portion of the packet and, only when they match, outputs the received packet. In this way, the expected response packet is received without fail. This enhances the reliability of the transmission medium.

8 Claims, 9 Drawing Sheets

PACKET TRANSMITTER-RECEIVER AND PACKET RECEIVER

This application is a U.S. National Phase application of PCT international application PCT/JP97/03250.

TECHNICAL FIELD

The present invention relates to a packet transmitting/receiving apparatus for transmitting and receiving packets using a transmission medium, and also relates to a packet receiving apparatus.

BACKGROUND ART

For digital data transmission and reception, communication is usually performed using packets as units. When a transmitting device transmits a packet, a receiving device receives the packet and takes out data carried in the packet. In such data communications using packets as units, when a packet is received the receiving device may return an acknowledge (hereinafter designated as ACK) indicating the status of the received packet to the transmitting device, to enhance communication reliability. This ACK includes an error occurrence state during transmission, the condition of the receiving device, etc. as well as information indicating whether or not a retransmission is necessary.

One of the interfaces that perform such packet communication is the IEEE 1394 interface. IEEE 1394 is the next-generation high-speed serial interface for multimedia, standardized by IEEE (refer to High Performance Serial Bus P1394/Draft 8.0v2). Currently, development is under way to use this IEEE 1394 for digital A/V equipment.

IEEE 1394 provides two types of packet transport modes: isochronous packet transport mode for the transport of data that needs real-time transmission, and asynchronous packet transport mode for the transport of data, such as a control command, etc., that does not need real-time transmission. Of these mode, in the transport of normal asynchronous packets, the receiving device returns an ACK to the transmitting device for each received packet. using this ACK, the receiving device can request a retransmission. On the other hand, for special asynchronous packets used for transmission to all the devices connected to the same interface, an ACK cannot be sent. In this case, none of the receiving devices can request a retransmission.

In IEEE 1394, there are two kinds of asynchronous packets: a request packet transmitted to request an action and a response packet transmitted to return the result of the action requested by the request packet. In either case, when a packet is received, an ACK is returned to the transmitting device. These two kinds of packets are usually used as a pair, except the case where processing is completed by returning an ACK to a request packet.

FIG. 1 shows a sequence diagram illustrating the case where a first device 1 transmits a request packet to a second device 2. When the first device 1 sends a request packet to the second device 2, the second device 2, upon receiving the packet, returns an ACK to the first device 1. The ACK in this case can indicate a retransmission request, completion of reception (request being processed), completion of processing, etc. When the ACK indicates a retransmission request, the first device 1 retransmits the request packet, as shown in FIG. 1. When ACK indicates the completion of the reception, this means that the second device 2 is processing the request, so that the first device 1 waits until the corresponding response packet is returned. When the ACK indicates the completion of processing, transmission of a response packet is not performed.

On the other hand, after transmitting the ACK indicating the completion of the reception, the second device 2 transmits to the first device 1 a response packet carrying the result of the processing requested by the request packet. Upon receiving the response packet, the first device 1 sends an ACK indicating a retransmission request or completion of processing. In this case also, if the ACK indicates a retransmission request, the second device 2 retransmits the response packet. Note here that since the response packet is not a packet requesting processing, an ACK indicating the completion of reception (request being processed) cannot be used.

In IEEE 1394, transmission and reception of a request packet and a response packet are performed as described above. However, in the case of the previously mentioned special request packets transmitted to all the devices connected to the same interface, ACKs are not transmitted.

IEEE 1394 specifies a timeout interval for detecting an interruption of processing during communications using such request and response packets. More specifically, when a request packet is transmitted, if a response packet is not received within a predefined time after receiving an ACK indicating the completion of the reception, then it is determined that the processing requested by the request packet has been interrupted because of some failure. The device that transmitted the request packet can then proceed to the next processing. On the other hand, the device that received the request packet must send a response packet within the predefined time. The default value of this predefined time is 100 ms, and the time setting can be changed arbitrarily.

On the other hand, IEEE 1394 provides a counter of about 25 MHZ, called a cycle time register, synchronized in all devices. As a function of the interface, it is guaranteed that the counter value is the same for all the devices. Therefore, the cycle time register can be used as a clock in the IEEE 1394 interface.

In IEEE 1394, where processing is performed using the request/response packet pair, there is a possibility that while waiting for a response packet after sending a request packet, a request packet or the like may arrive from another device. This necessitates increasing the capacity of a packet receiving buffer so that a plurality of packets can be received. Further, if the packet receiving buffer cannot be used because a new request packet has been received, an ACK indicating a retransmission request for a response packet will have to be transmitted. Because of such a retransmission request, a timeout may occur, interrupting the processing. Such interruption of the processing can significantly reduce communication reliability.

Furthermore, since the processing of a response packet cannot be carried out while processing the new request packet, an ACK requesting a retransmission will be returned in reply to the received response packet. In this case also, an interruption of processing may occur, as in the above case. Therefore, there has been a need for a packet transmitting/receiving apparatus that can receive a response packet reliably without causing an interruption in processing.

Further, while waiting for the expected response packet, if a new request packet is received from another device, multiple processes that require servicing will occur simultaneously. Accordingly, all devices are required to have the capability to carry out multiple processes, the resulting problem being that the processing and configuration of each device increase in complexity.

On the other hand, in IEEE 1394, a special type of packet may be used that is sent to all the devices connected to the same interface. This special type of packet is primarily used when transmitting important information, for example, to manage the entire interface. For this special type of packet, however, a retransmission request cannot be made using an ACK. As a result, when the packet receiving buffer cannot be used because it is used for other packets, for example, the special packet cannot be received. This degrades the reliability of the entire interface, and can render correct packet reception and transmission impossible.

As earlier stated, in IEEE 1394, the maximum time interval between the transmission of a request packet and the transmission of a response packet is predefined. If the corresponding response packet is not received within the predefined time, the device that sent the request packet determines that the processing has been interrupted. On the other hand, the device that received the request packet must send a response packet within the predefined time interval, but there can be cases where the device is unable to send a response packet within the predefined time, depending on the condition of the device.

In that case, if the device sends a response packet after the predefined time has elapsed, the packet thus sent is not only wasted but can interfere with the transmission of other valid packets.

DISCLOSURE OF THE INVENTION

Considering such conventional problems, the object of the present invention is to realize a packet transmitting/receiving apparatus for transmitting and receiving a transmitting packet and a response packet without fail using a transmission medium, and a packet receiving apparatus for receiving a request packet.

To solve such problems, one aspect of the present invention (according to claim 1) is a packet transmitting/receiving apparatus comprising packet transmitting means for transmitting a packet; packet receiving means for receiving and outputting a packet; and reception control means for controlling the operation of said packet receiving means on the basis of the packet transmitted by said packet transmitting means.

Another aspect of the present invention (according to claim 2) is a packet transmitting/receiving apparatus, wherein said reception control means performs control so as not to receive any packet other than a response packet corresponding to the request packet transmitted by said packet transmitting means.

Still another aspect of the present invention (according to claim 3) is a packet transmitting/receiving apparatus, wherein said reception control means performs control so as not to receive any packet other than a response packet corresponding to the request packet transmitted by said packet transmitting means, during a time interval between the transmission of said request packet and the reception of said response packet.

A further aspect of the present invention is a packet transmitting/receiving apparatus, wherein said reception control means performs control so as not to receive any packet other than a response packet corresponding to the request packet transmitted by said packet transmitting means, until said response packet is received within a predefined time after the transmission of said request packet.

A still further aspect of the present invention is a packet transmitting/receiving apparatus comprising packet transmitting means for transmitting a packet; packet receiving means for receiving and outputting a packet; prediction means for predicting, based on the request packet transmitted by said packet transmitting means, packet identification information of a response packet corresponding to said request packet, and for outputting said predicted identification information; and comparing means for comparing said predicted identification information supplied from said prediction means with received identification information of the received packet supplied from said packet receiving means, and for outputting said received packet only when said received packet is the packet corresponding to said response packet.

Still another aspect of the present invention is a packet transmitting/receiving apparatus, wherein said comparing means discards said predicted identification information unless said response packet is received within a predefined time after said request packet is transmitted by said packet transmitting means.

A still further aspect of the present invention is a packet transmitting/receiving apparatus comprising packet receiving means for receiving and outputting a packet; normal packet accumulating means for temporarily accumulating a packet for which a retransmission request can be made; particular packet accumulating means for temporarily accumulating a packet for which a retransmission request cannot be made; packet selecting means for receiving the received packet from said packet receiving means, and writing said received packet either to said normal packet accumulating means or to said particular packet accumulating means, depending on whether or not said received packet is a packet for which a retransmission request can be made, and for directing a retransmission of said received packet when said received packet is a packet for which a retransmission request can be made, and when said packet is received while said normal packet accumulating means is in use; and retransmission requesting means for requesting a retransmission of said packet based on the direction of said packet selecting means.

A further aspect of the present invention is a packet transmitting/receiving apparatus , wherein when a packet for which a retransmission request can be made is received from said packet receiving means, and when directing a retransmission of said received packet, said packet selecting means discards said received packet.

A still further aspect of the present invention is a packet transmitting/receiving apparatus, wherein when a packet for which a retransmission request cannot be made is received from said packet receiving means, and when said exception packet accumulating means is in use, said packet selecting means discards said received packet.

An additional aspect of the present invention is a packet transmitting/receiving apparatus comprising packet receiving means for receiving and outputting a packet packet accumulating means for temporarily accumulating the received packet received by said packet receiving means; time outputting means for outputting a time; receive time holding means for accepting said time from said time outputting means, and for holding a write time at which said received packet was written to said packet accumulating means by said packet receiving means; response packet generating means for, when said received packet needs a response packet corresponding thereto, generating said response packet based on said received packet accumulated in said packet accumulating means, said write time held in said receive time holding means, and said time output from said time outputting means, and outputting said generated response packet; and packet transmitting means for transmitting said response packet.

Still an additional aspect of the present invention is a packet transmitting/receiving apparatus, wherein said response packet generating means outputs said response packet only when the time input from said time outputting means when outputting said response packet is earlier than a time obtained by adding a predetermined value to said write time.

Still another aspect of the present invention is a packet transmitting/receiving apparatus comprising packet receiving means for receiving and outputting a packet;,packet accumulating means for temporarily accumulating the received packet received by said packet receiving means; time outputting means for outputting a time; receive time holding means for accepting said time from said time outputting means, and for holding a write time at which said received packet was written to said packet accumulating means by said packet receiving means; response packet generating means for, when said received packet needs a response packet corresponding thereto, generating said response packet by reading out said received packet accumulated in said packet accumulating means and said write time held in said receive time holding means, and outputting said generated response packet and said write time; and packet transmitting means for accepting said time from said time outputting means and said response packet and said write time from said response packet generating means, and for transmitting said response packet only when the time at which the transmission is made is not later than a time obtained by adding a predetermined value to said write time.

A further aspect of the present invention is a packet transmitting/receiving apparatus comprising packet receiving means for receiving and outputting a packet; packet accumulating means for temporarily accumulating the received packet received by said packet receiving means; time outputting means for outputting a time; measuring means for accepting said time from said time outputting means, and for measuring and outputting a time elapsed after said received packet was written to said packet accumulating means by said packet receiving means; response packet generating means for, when said received packet needs a response packet corresponding thereto, generating said response packet based on said received packet accumulated in said packet accumulating means and said elapsed time output from said measuring means, and outputting said generated response packet; and packet transmitting means for transmitting said response packet.

A still further aspect of the present invention is a packet transmitting/receiving apparatus, wherein said response packet generating means outputs said response packet only when said elapsed time is less than a predetermined value.

A still further aspect of the present invention is a packet receiving apparatus comprising packet receiving means for receiving and outputting a packet; packet accumulating means for temporarily accumulating the received packet received by said packet receiving means; time outputting means for outputting a time; measuring means for accepting said time from said time outputting means, and for measuring and outputting a time elapsed after said received packet was written to said packet accumulating means by said packet receiving means; and elapsed time monitoring means for, when said packet needs a response packet corresponding thereto, monitoring said elapsed time being output from said measuring means and, if said elapsed time exceeds a predefined time, discarding said received packet accumulated in said packet accumulating means.

In one aspect of the invention, when the packet transmitting means transmits a request packet, the packet receiving means waits to receive a packet. At this time, if the received packet from the transmission medium is the response packet indicated by the control information from the reception control means, this packet is received and output to the outside.

In another aspect of the invention, when the packet transmitting means transmits a request packet, the packet receiving means waits to receive a packet. Based on the transmitted request packet, the prediction means predicts the packet identification information of the response packet corresponding to the request packet. The comparing means identifies whether the received packet is the response packet corresponding to the request packet by comparing the predicted identification information supplied from the prediction means with the received identification information of the received packet supplied from the packet receiving means, and outputs the received packet to the outside only when the result of the comparison is affirmative.

In still another aspect of the invention, the normal packet accumulating means temporarily accumulates a packet for which a retransmission request can be made, and the particular packet accumulating means temporarily accumulates a packet for which a retransmission request cannot be made. The packet selecting means receives the received packet from the packet receiving means, and writes the receives packet either to the normal packet accumulating means or to the particular packet accumulating means, depending on whether or not the received packet is a packet for which a retransmission request can be made. Further, when a packet for which a retransmission request can be made is received while the normal packet accumulating means is in use, the retransmission requesting means directs a retransmission of the received packet based on the direction of the packet selecting means.

In yet another aspect of the invention, the packet accumulating means temporarily accumulates the received packet received by the packet receiving means. When the time is input from the time outputting means, the receive time holding means holds the time at which the received packet was written to the packet accumulating means by the packet receiving means. When the received packet needs a response packet corresponding thereto, the response packet generating means generates the response packet based on the received packet accumulated in the packet accumulating means, the write time held in the receive time holding means, and the time output from the time outputting means, and outputs the thus generated response packet.

In a still further aspect of the invention, the packet accumulating means temporarily accumulates the received packet received by the packet receiving means. When the time is input from the time outputting means, the receive time holding means holds the time at which the received packet was written to the packet accumulating means by the packet receiving means. When the received packet needs a response packet corresponding thereto, the response packet generating means generates the response packet by reading out the received packet accumulated in the packet accumulating means and the write time held in the receive time holding means, and outputs the thus generated response packet and the write time. The packet transmitting means accepts the time from the time outputting means and the response packet and write time from the response packet generating means, and transmits the response packet only when the time at which the transmission is made is not later than a time obtained by adding a predetermined value to the write time.

In an additional aspect of the invention, the packet accumulating means temporarily accumulates the received packet received by the packet receiving means. When the time is input from the time outputting means, the measuring means measures the time elapsed after the received packet was written to the packet accumulating means by the packet receiving means. When the received packet needs a response packet corresponding thereto, the response packet generating means generates the response packet based on the receive packet accumulated in the packet accumulating means and the elapsed time output from the measuring means, and outputs the thus generated response packet.

In still an additional aspect of the invention, the packet accumulating means temporarily accumulates the received packet received by the packet receiving means. When the time is input from the time outputting means, the measuring means measures the time elapsed after the received packet was written to the packet accumulating means by the packet receiving means. When the received packet needs a response packet corresponding thereto, the elapsed time monitoring means monitors the time being output from the measuring means and, if the elapsed time exceeds a predefined time, discards the received packet accumulated in the packet accumulating means.

DESCRIPTION OF THE REFERENCE NUMERALS

10, 20, 30, 40, 50, 60 . . . PACKET TRANSMITTING/RECEIVING APPARATUS
11, 21, 41, 51, 61 . . . PACKET TRANSMITTING MEANS
12, 22, 32, 42, 52, 62, 72 . . . PACKET RECEIVING MEANS
13. RECEPTION CONTROL MEANS
14, 24 . . . PACKET GENERATING MEANS
15, 25, 33, 43, 53, 63, 73 . . . TRANSMISSION MEDIUM
23. PREDICTION MEANS
26. COMPARING MEANS
31. RETRANSMISSION REQUESTING MEANS
34. PACKET SELECTING MEANS
36. PARTICULAR PACKET ACCUMULATING MEANS
35. NORMAL PACKET ACCUMULATING MEANS
44, 54, 64, 74 . . . TIME OUTPUTTING-MEANS
45, 55 . . . RECEIVE TIME HOLDING MEANS
46, 56, 66, 76 . . . PACKET ACCUMULATING MEANS
47, 57, 67 . . . RESPONSE PACKET GENERATING MEANS
65. MEASURING MEANS
70. PACKET RECEIVING APPARATUS
77. ELAPSED TIME MONITORING MEANS
901. DESTINATION ID
2902. tl (TRANSACTION LABEL)
903. rt
904. tcode (TRANSACTION CODE)
905. prl
906. SOURCE ID
907. INFORMATION DEPENDENT ON PACKET TYPE
908. HEADER CRC
909. DATA
910. DATA CRC
911. PACKET HEADER
912. DATA FIELD

BEST MODE FOR CARRYING OUT THE INVENTION

Embodiment 1

Figure 2:
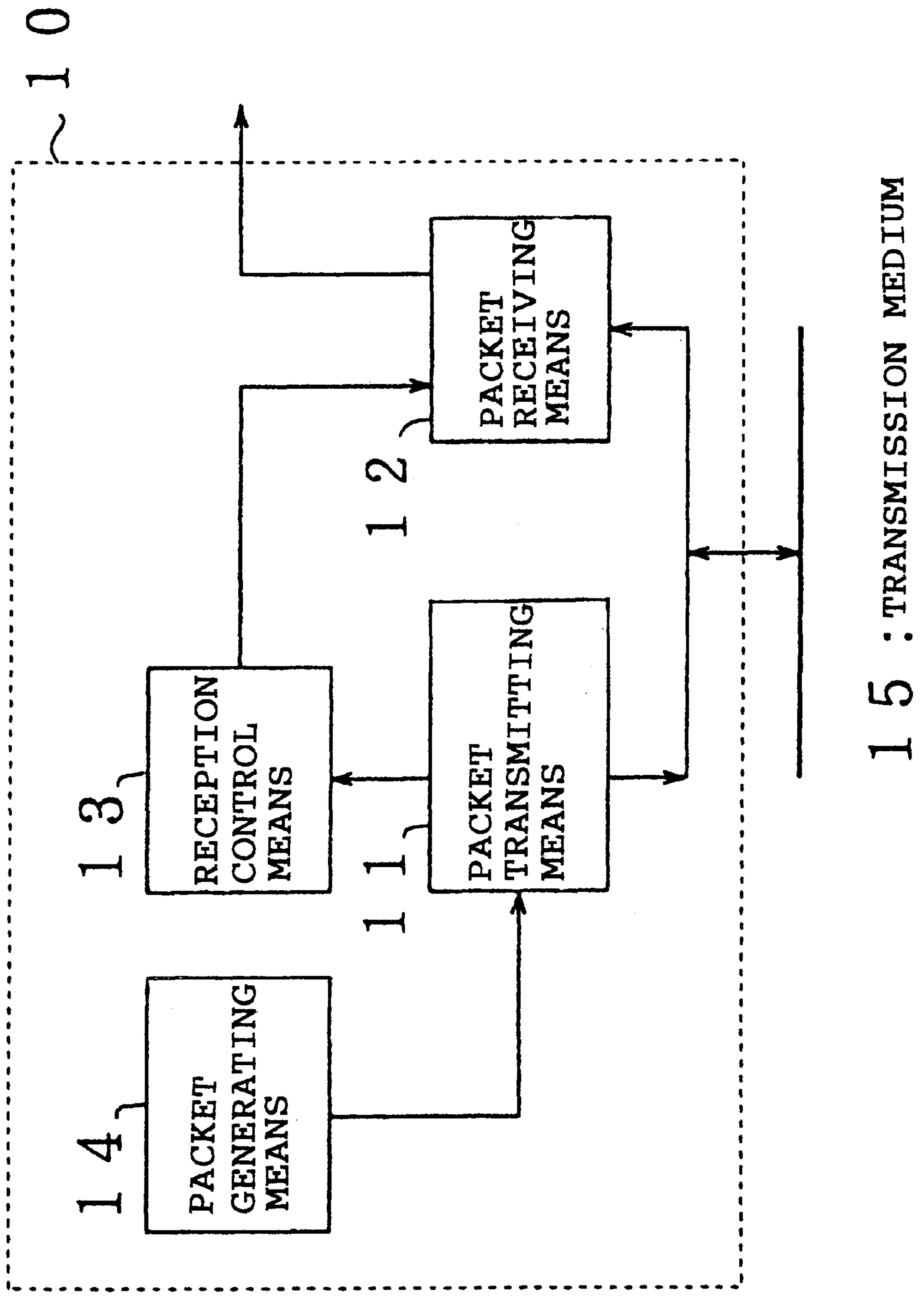
FIG. 2 is a block diagram showing the basic configuration of a packet transmitting/receiving apparatus according to a first embodiment of the present invention.

A packet transmitting/receiving apparatus according to a first embodiment of the present invention will be described below with reference to drawing. FIG. 2 is a block diagram showing the basic configuration of the packet transmitting/receiving apparatus according to the first embodiment. The packet transmitting/receiving apparatus 10 is an apparatus that transmits a request packet onto a transmission medium 15 and receives a response packet, and comprises a packet transmitting means 11, a packet receiving means 12, a reception control means 13, and a packet generating means 14.

The packet generating means 14 generates a request packet and supplies it to the packet transmitting means 11. Upon receiving the request packet, the packet transmitting means 11 transmits it out onto the transmission medium 15 while supplying the same to the reception control means 13. When outputting the packet on the transmission medium 15, the packet transmitting means 11 performs operations such as arbitration needed on the transmission medium 15.

The reception control means 13 accepts at its input the request packet output from the packet transmitting means 11, and supplies the packet receiving means 12 with control information for receiving only the response packet corresponding to the request packet. When a packet is received from the transmission medium 15, if the received packet is the response packet indicated by the control information supplied from the reception control means 13, the packet receiving means 12 supplied with the control information accepts the received packet and outputs it to the outside. On the other hand, if the received packet is not the response packet indicated by the control information, the packet receiving means 12 discards it. The packet receiving means 12 also performs detection of transmission errors, etc.

Figure 9:
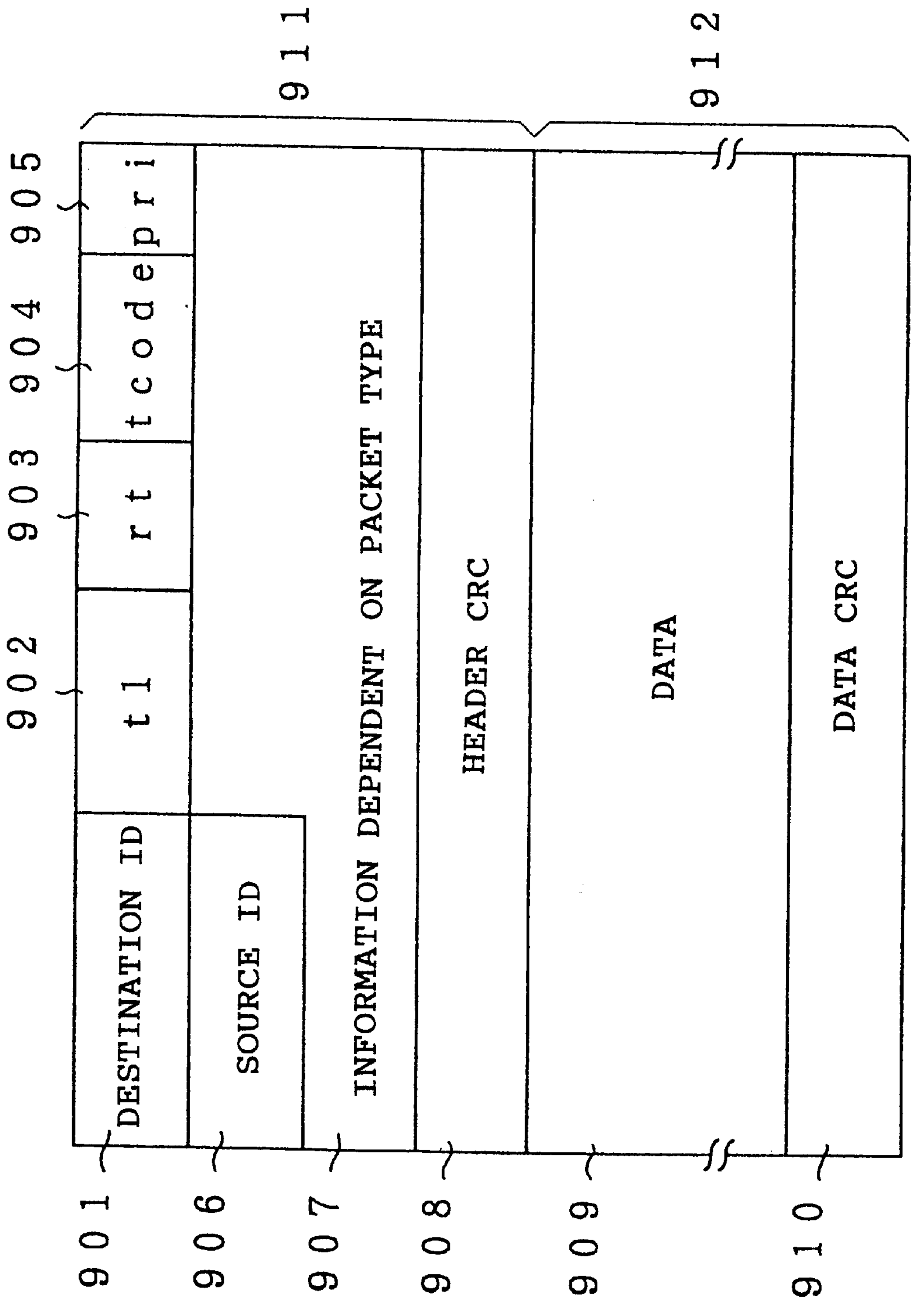
FIG. 9 is a diagram showing the format of a packet transmitted and received in IEEE 1394.

FIG. 9 shows the packet format used for the request packet and response packet when IEEE 1394 is used for the transmission medium 15.

As shown in the figure, the packet has a packet header 911 and a data field 912. Data 909 such as a control command, etc. is placed in the data field 912 together with a data CRC 910. The packet header 911 carries data such as a destination ID 901, a source ID 906, tl (transaction label) 902, rt (retry) 903, tcode (transaction code) 904, pri (priority) 905, information dependent on packet type 907, and a header CRC 908.

In IEEE 1394, the distinction between a request packet and a response packet can be made by using the tcode (transaction code) 904. Further, IEEE 1394 provides multiple kinds of request packets and multiple kinds of response packets corresponding to the respective request packets. Using the tcode 904, the kind of request packet or response packet can be identified. Accordingly, when the reception control means 12 outputs the tcode of the expected packet as the control information to the packet receiving means 12, the packet receiving means 12 can determine whether the received packet is a packet that should be accepted or discarded, by examining the header of the received packet.

In this way, by not receiving packets other than the expected response packet, it is possible to prevent reception of another request packet while waiting for the response packet. That is, the packet transmitting/receiving apparatus 10 need not carry out multiple processes simultaneously. Moreover, since reception of a new request packet is prevented, the expected response packet can be received without fail.

At this time, when receiving a response packet of any kind without identifying the kind of the response packet, it is also possible to prevent reception of a request packet from another device while waiting for the response packet.

When the expected response packet has been received, the reception control means 13 can stop the above control, allowing the reception of a request packet. Further, in IEEE 1394, since the maximum time interval between the transmission of a request packet and the transmission of a response packet is predefined, the reception control means 13 can stop the control for receiving only the response packet when the predefined time has elapsed. In this way, another processing can be performed when the response packet cannot be received because of a failure on the transmission medium 15, etc.

When the received request packet is discarded, a retransmission request for the request packet can be sent at a later time to receive the request packet again for processing. In particular, when IEEE 1394 is used for the transmission medium 25, if the received request packet is discarded, an ACK can be sent to the transmitting device of the request packet to request a retransmission of the request packet.

Further, if the reception control means 13 is omitted, and instead, the packet generating means 14 is configured to also serve the control function and control the packet receiving means 12 directly, an equivalent effect can be obtained.

Embodiment 2

Figure 3:
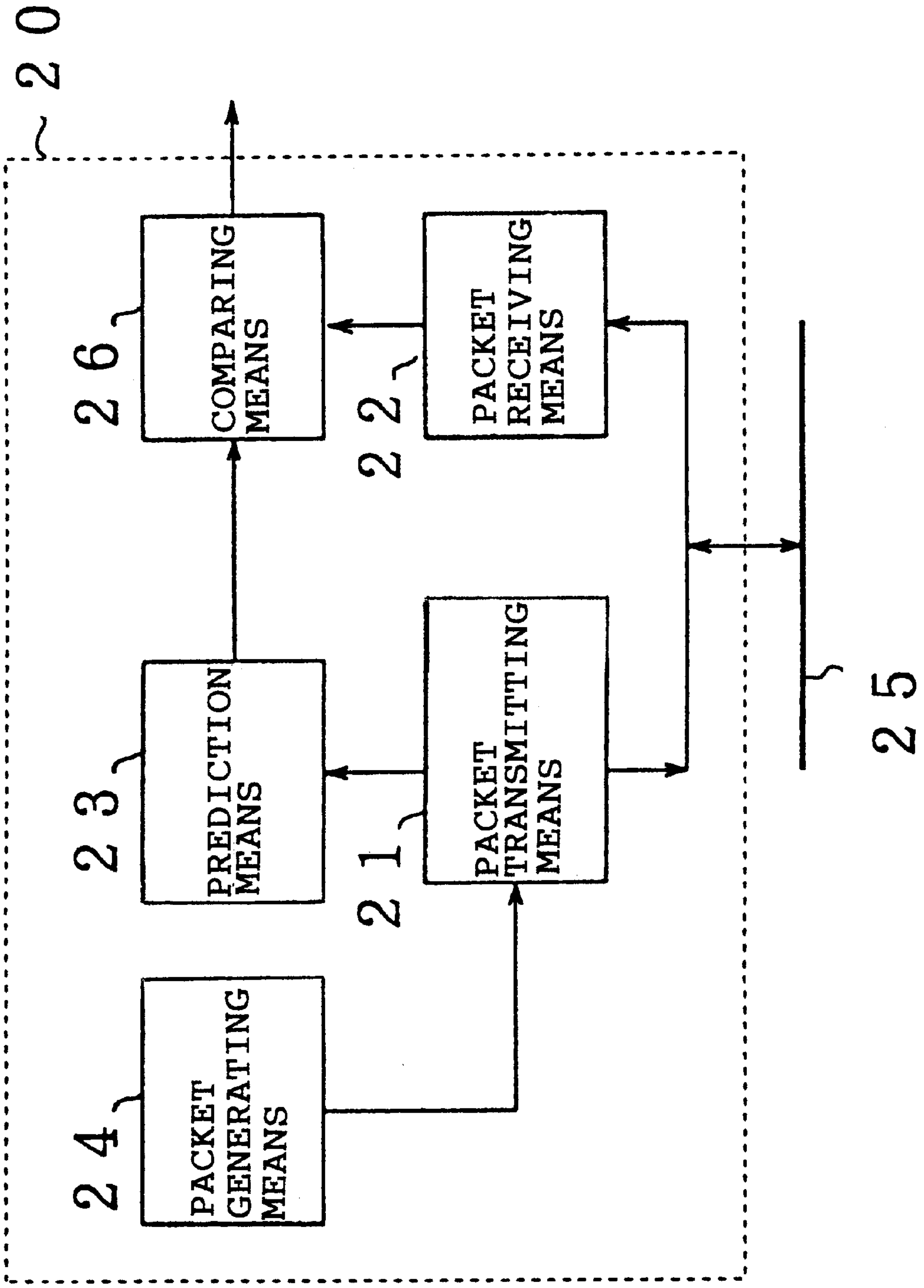
FIG. 3 is a block diagram showing the basic configuration of a packet transmitting/receiving apparatus according to a second embodiment of the present invention.

A packet transmitting/receiving apparatus according to a second embodiment of the present invention will be described below with reference to drawing. FIG. 3 is a block diagram showing the basic configuration of the packet transmitting/receiving apparatus according to the second embodiment. The same parts as those in the first embodiment are designated by the same names, and detailed descriptions of such parts are omitted. The packet transmitting/receiving apparatus 20 is an apparatus that transmits a request packet onto a transmission medium 25 and receives a response packet, and comprises a packet transmitting means 21, a packet receiving means 22, a prediction means 23, a packet generating means 24, and a comparing means 26.

The packet generating means 24 generates a request packet and supplies it to the packet transmitting means 21. Upon receiving the request packet, the packet transmitting means 21 transmits it out onto the transmission medium 25 while supplying the same to the prediction means 23. When outputting the packet on the transmission medium 25, the packet transmitting means 21 performs operations such as arbitration needed on the transmission medium 25. On the other hand, when a packet is received from the transmission medium 25, the packet receiving means 22 supplies the packet to the comparing means 26. At this time, the packet receiving means 22 also performs detection of transmission errors, etc.

Based on a portion of the request packet transmitted by the packet transmitting means 21, the prediction means 23 predicts a portion of the expected response packet, and supplies that portion to the comparing means 26. The comparing means 26 compares a portion of the received packet with that portion of the predicted packet supplied from the prediction means 23 and, when they match, outputs the received packet. When they do not match, the received packet is discarded.

When IEEE 1394 is used for the transmission medium 25, the prediction means.23 predicts a portion of the packet header 911 in the expected response packet, based on the packet header 911 of the request packet transmitted by the packet transmitting means 21. At this time, since the tcode 904 in the packet header 911 is for identifying the kind of request packet or response packet, as previously shown in FIG. 9, the tcode of the response packet can be predict ed from the tcode of the request packet. The tl 902 is the same for both the request packet and response packet. Further, the destination ID 901 and Source ID 906 can be predicted by interchanging the destination ID and source ID in the transmitted request packet.

When the packet header of the expected response packet is input from the prediction means 23, and the received packet is received from the packet receiving means 23, the comparing means 26 compares the packet header of the received packet with the packet header input from the prediction means 23. In this case, only the portion predicted by the prediction means 23 is compared, rather than comparing all the portions of the packet header, and when they match, the received packet is output to the outside. On the other hand, when they do not match, the received packet is discarded.

When the received request packet is discarded, a retransmission request for the request packet can be sent at a later time to receive the request packet again for processing. In particular, when IEEE 1394 is used for the transmission medium 25, if the received request packet is discarded, an ACK can be sent to the transmitting device of the request packet to request a retransmission of the request packet.

Further, if the packet generating means 24 is configured to also serve the function of the prediction means 23, the prediction means 23 can be omitted; in that case also, an equivalent effect can be obtained.

Embodiment 3

Figure 4:
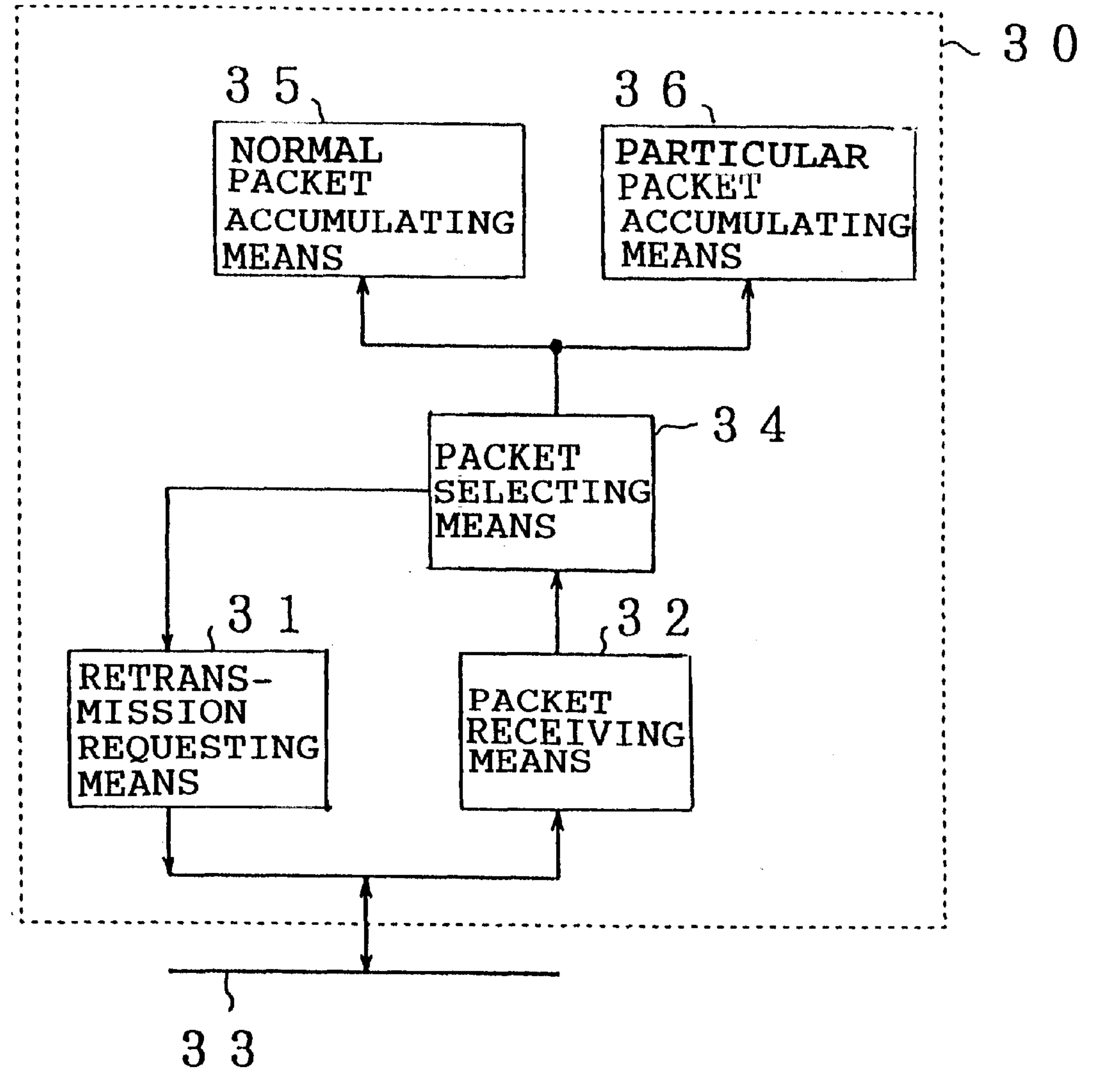
FIG. 4 is a block diagram showing the basic configuration of a packet transmitting/receiving apparatus according to a third embodiment of the present invention.

A packet transmitting/receiving apparatus according to a third embodiment of the present invention will be described below with reference to drawing. FIG. 4 is a block diagram showing the basic configuration of the packet transmitting/receiving apparatus according to the third embodiment. The packet transmitting/receiving apparatus 30 comprises a retransmission requesting means 31, a packet receiving means 32, a packet selecting means 34, an normal packet accumulating means 35, and an particular packet accumulating means 36.

The packet receiving means 32 receives a packet from the transmission medium 33. At this time, the packet receiving means 32 performs detection of transmission errors, etc. The packet selecting means 34 that received the received packet performs a packet selection by determining whether or not the received packet is a packet for which a retransmission request can be made. If it is a packet for which a retransmission request can be made, the packet is written to the normal packet accumulating means 35. At this time, if the normal packet accumulating means 35 is in use and writing cannot be done, a retransmission request is output and the received packet is discarded. On the other hand, if the received packet is a packet for which a retransmission request cannot be made, the received packet is written to the particular packet accumulating means 36. At this time, if the particular packet accumulating means 36 is in use and writing cannot be done, the received packet is discarded.

When the retransmission request is received from the packet selecting means 34, the retransmission requesting means 31 outputs the retransmission request on the transmission medium 33. When IEEE 1394 is used for the transmission medium 33, a broadcast packet corresponds to the particular packet. The broadcast packet is transmitted to all devices connected to the same bus, and is used primarily for bus management. When an normal packet is received, the receiving apparatus sends an ACK after receiving the packet, and can make a retransmission request, if necessary. On the other hand, the broadcast packet is a packet that is received by all nodes on the bus, and transmission of an ACK is not performed. Therefore, a retransmission request using an ACK cannot be made. To address this, the accumulating means for broadcast packets is provided separately from the accumulating means for normal packets so that important packets for bus management, etc. can be received in a more reliable manner.

Embodiment 4

Figure 5:
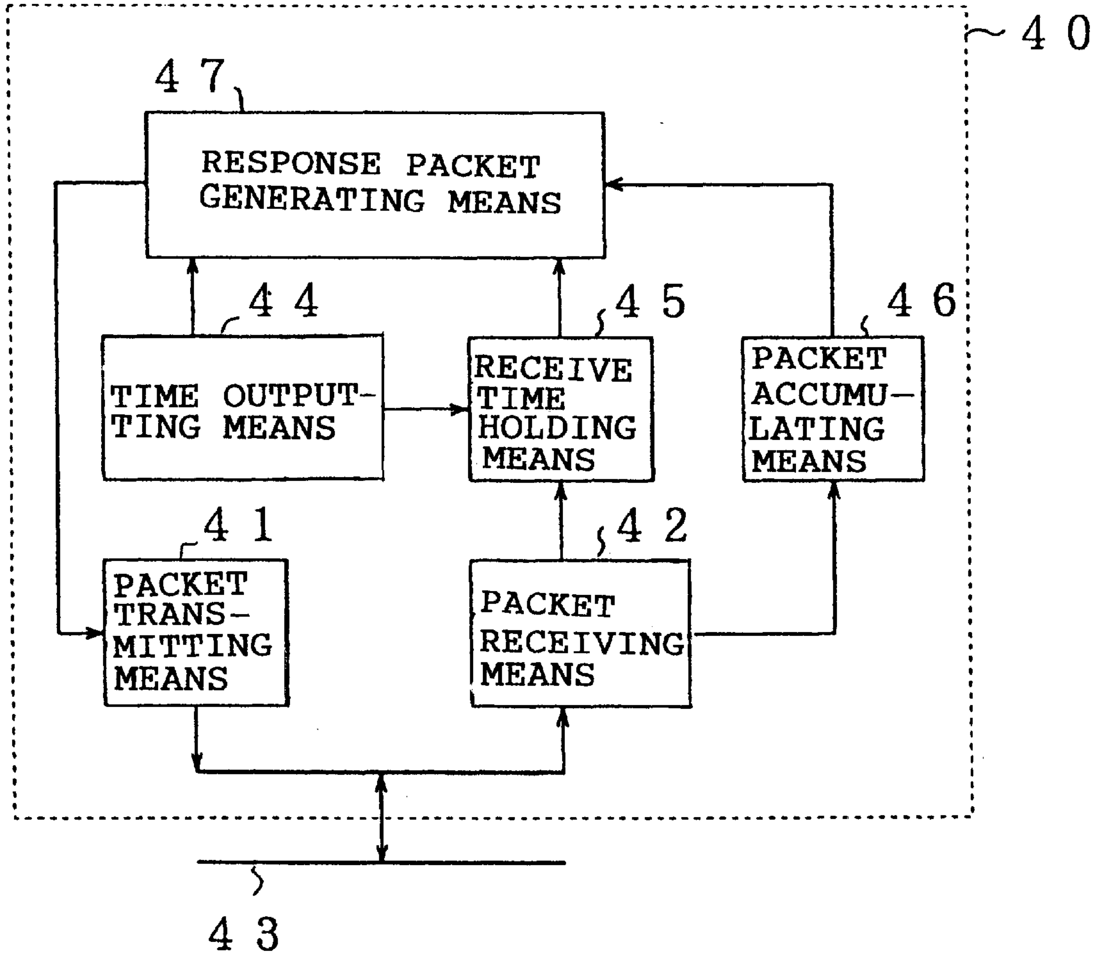
FIG. 5 is a block diagram showing the basic configuration of a packet transmitting/receiving apparatus according to a fourth embodiment of the present invention.

A packet transmitting/receiving apparatus according to a fourth embodiment of the present invention will be described below with reference to drawing. FIG. 5 is a block diagram showing the basic configuration of the packet transmitting/receiving apparatus according to the fourth embodiment. The packet transmitting/receiving apparatus 40 is one that transmits a response packet by generating it based on the received request packet, and comprises a packet transmitting means 41, a packet receiving means 42, a time outputting means 44, a receive time holding means 45, a packet accumulating means 46, and a response packet generating means 47.

When a request packet is received from the transmission medium 43, the packet receiving means 42 writes the received packet to the packet accumulating means 46 and outputs a packet reception notification. The receive time holding means 45 takes as an input the time output from the time outputting means 44 and holds the time at which the packet reception notification was received from the packet receiving means 42.

The response packet generating means 47 reads the request packet from the packet accumulating means 46, and generates and outputs a response packet corresponding to the request packet. Here, the response packet generating means 47 can be implemented using a microcomputer or the like. The packet transmitting means 41 sends the response packet generated by the response packet generating means 47 out onto the transmission medium 43.

When generating the response packet by reading the request packet from the packet accumulating means 46, the response packet generating means 47 takes as inputs the request packet receive time from the receive time holding means 45 and also the time output from the time outputting means 44. Here, if the predefined time has already elapsed from the reception of the request packet, the response packet generating means 47 stops generating the response packet. Also, when outputting the generated response packet to the packet transmitting means 41, if the predefined time has already elapsed from the reception of the request packet, the generated response packet is not output, but is discarded.

Figure 1:
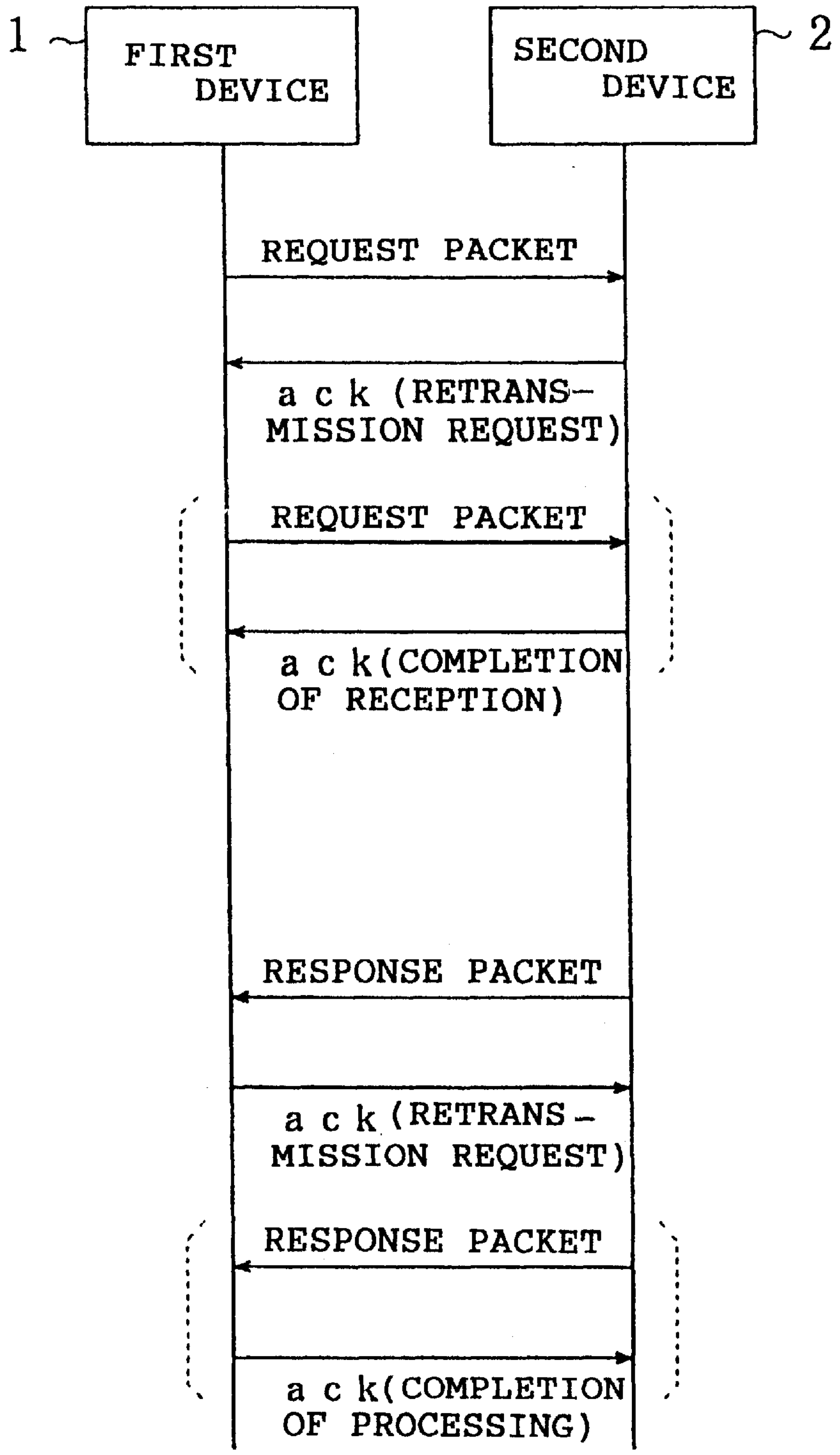
FIG. 1 is a sequence diagram showing the transmission/reception relationship of a request packet and a response packet in IEEE 1394.

When IEEE 1394 is used for the transmission medium 43, the maximum time interval between the transmission of a request packet and the reception of a response packet is predefined, as shown in FIG. 1; therefore, when generating and outputting the response packet, the response packet generating means 47 can perform control so as not to generate or transmit a response packet that would be rendered invalid if transmitted, by recognizing the time at which the request packet was received. Further, the cycle time register provided in all devices can be used as the time outputting means 44.

Embodiment 5

Figure 6:
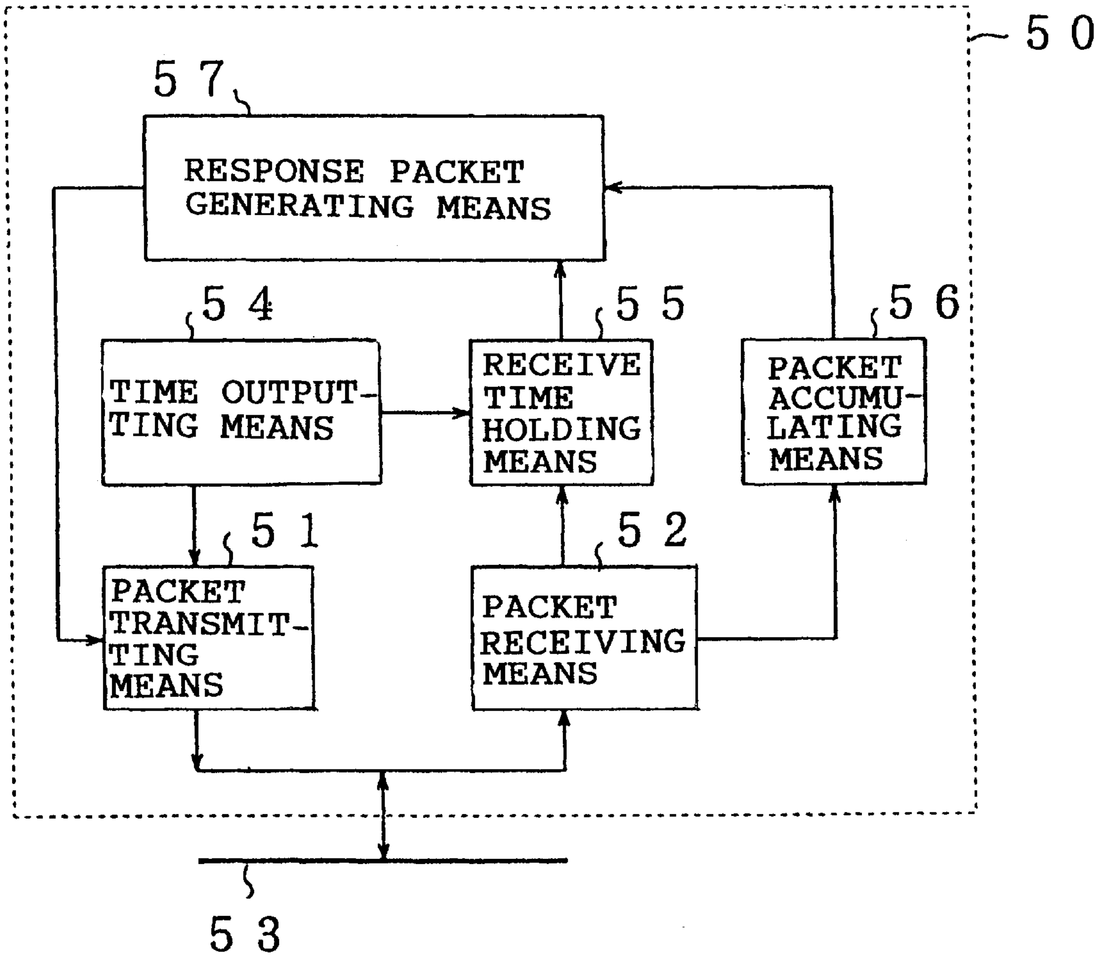
FIG. 6 is a block diagram showing the basic configuration of a packet transmitting/receiving apparatus according to a fifth embodiment of the present invention.

A packet transmitting/receiving apparatus according to a fifth embodiment of the present invention will be described below with reference to drawing. FIG. 6 is a block diagram showing the basic configuration of the packet transmitting/receiving apparatus according to the fifth embodiment. The packet transmitting/receiving apparatus 50 is one that transmits a response packet by generating it based on the received request packet, and comprises, as in the fourth embodiment, a packet transmitting means 51, a packet receiving means 52, a time outputting means 54, a receive time holding means 55, a packet accumulating means 56, and a response packet generating means 57.

When a plurality of request packets are received from the transmission medium 53, the packet receiving means 52 writes the received packets to the packet accumulating means 56 and outputs packet reception notifications. The receive time holding means 55 takes as an input the time output from the time outputting means 54 and holds a plurality of times at which the respective packet reception notifications were received from the packet receiving means 52.

Since the packet accumulating means 56 is capable of accumulating a plurality of packets, and the receive time holding means 55 also is capable of holding a plurality of times, the response packet generating means 57 can process the plurality of request packets at a time by reading from the receive time holding means 55 the receive time corresponding to each request packet read from the packet accumulating means 56. That is, the number of request packets that can be temporarily accumulated in the packet accumulating means 56 is not limited to 1, and by holding a plurality of receive times in the receive time holding means while maintaining the correspondence with the respective request packets, corresponding response packets can be generated even when a plurality of request packets are received.

The packet transmitting means 51 takes as inputs the response packet and the request packet receive time from the response packet generating means 57 and also the time output from the time outputting means. 54. Here, if the predefined time has not yet elapsed from the request packet receive time, the response packet input from the response packet generating means 57 is output on the transmission medium 53. On the other hand, if the predefined time has already elapsed from the reception of the request packet, the response packet is discarded.

When IEEE 1394 is used for the transmission medium 43, the maximum time interval between the transmission of a request packet and the reception of a response packet, shown in FIG. 1, is defined; therefore, after the predefined time has elapsed from the transmission of the request packet, the corresponding response packet would be rendered invalid if transmitted. Furthermore, since bus arbitration is necessary when sending out a packet, it takes a finite time to actually send out the packet after a transmit request is made. Therefore, by judging the validity of the response packet transmission at the end of the bus arbitration, transmission of an invalid packet can be prevented. Further, the cycle time register provided in all devices can be used as the time outputting means 54.

Embodiment 6

Figure 7:
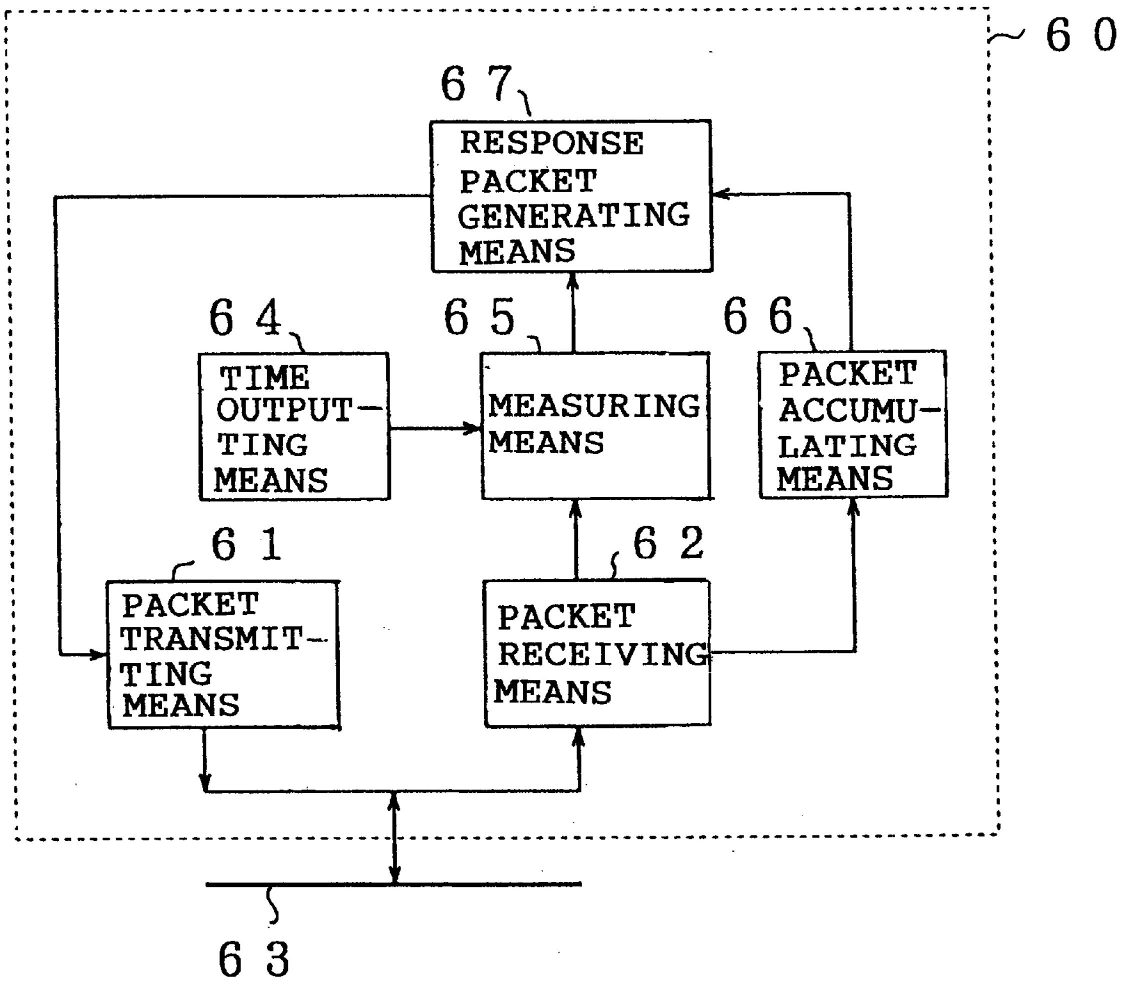
FIG. 7 is a block diagram showing the basic configuration of a packet transmitting/receiving apparatus according to a sixth embodiment of the present invention.

A packet transmitting/receiving apparatus according to a sixth embodiment of the present invention will be described below with reference to drawing. FIG. 7 is a block diagram showing the basic configuration of the packet transmitting/receiving apparatus according to the sixth embodiment. The packet transmitting/receiving apparatus 60 is one that transmits a response packet by generating it based on the received request packet, and comprises a packet transmitting means 61, a packet receiving means 62, a time outputting means 64, a measuring means 65, a packet accumulating means 66, and a response packet generating means 67.

When a request packet is received from the transmission medium 63, the packet receiving means 62 writes the received packet to the packet accumulating means 66 and outputs a packet reception notification. The measuring means 65 takes as an input the time output from the time outputting means 64, and measures the time elapsed from the time the packet reception notification was received from the packet receiving means 62 and outputs the measured time.

The response packet generating means 67 reads the request packet from the packet accumulating means 66, and generates and outputs a response packet corresponding to the request packet. Here, the response packet generating means 67 can be implemented using a microcomputer or the like. The packet transmitting means 61 sends the response packet generated by the response packet generating means 67 out onto the transmission medium 63.

When generating the response packet by reading the request packet from the packet accumulating means 66, the response packet generating means 67 takes as an input the elapsed time from the reception of the request packet measured by the measuring means 65. Here, if the elapsed time from the reception of the request packet exceeds a predetermined value, the response packet generating means 67 stops generating the response packet. Also, when outputting the generated response packet to the packet transmitting means 61, if the elapsed time from the reception of the request packet exceeds the predetermined value, the generated response packet is not output, but is discarded.

When IEEE 1394 is used for the transmission medium 63, the maximum time interval between the transmission of a request packet and the reception of a response packet, shown in FIG. 1, is predefined; therefore, when generating and outputting the response packet, the response packet generating means 67 is able to know the time that has elapsed from the reception of the request packet. Control therefore can be performed so as not to generate or transmit a response packet that would be rendered invalid if transmitted. Further, the cycle time register provided in all devices can be used as the time outputting means 64.

Embodiment 7

Figure 8:
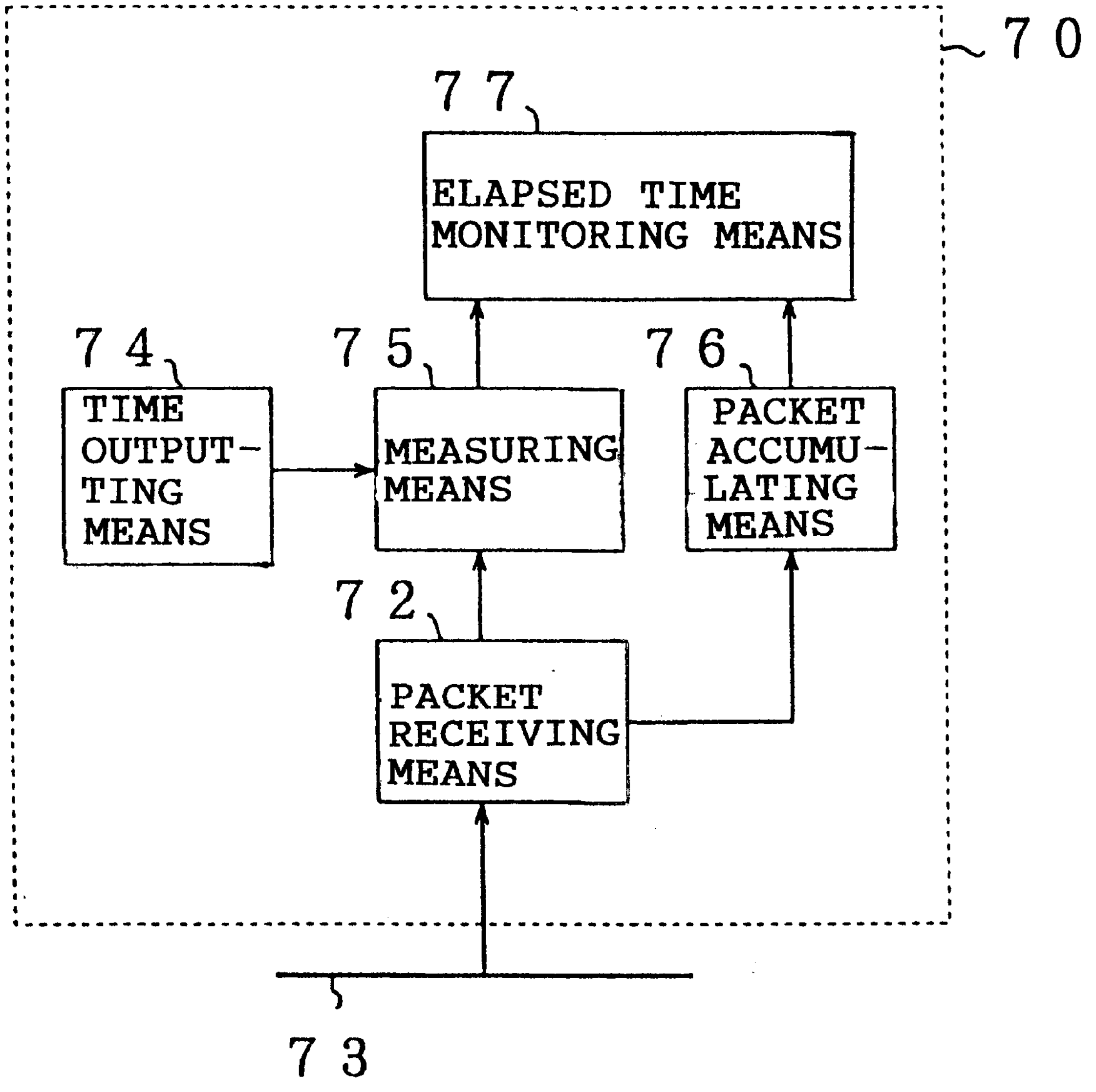
FIG. 8 is a block diagram showing the basic configuration of a packet receiving apparatus according to a seventh embodiment of the present invention.

A packet receiving apparatus according to a seventh embodiment of the present invention will be described below with reference to drawing. FIG. 8 is a block diagram showing the basic configuration of the packet receiving apparatus according to the seventh embodiment. The packet receiving apparatus 70 is one that receives a request packet from a transmission medium 73, and comprises a packet receiving means 72, a time outputting means 74, a measuring means 75, a packet accumulating means 76, and an elapsed time monitoring means 77.

When a request packet is received from the transmission medium 73, the packet receiving means 72 writes the received packet to the packet accumulating means 76 and outputs a packet reception notification. The measuring means 75 takes as an input the time output from the time outputting means 74, and measures the time elapsed from the time the packet reception notification was received from the packet receiving means 72 and outputs the measured time.

The elapsed time monitoring means 77 takes as an input the elapsed time from the reception of the request packet measured by the measuring means 75, and if the elapsed time exceeds the predefined time, the request packet written to the packet accumulating means 76 is discarded.

When IEEE 1394 is used for the transmission medium 73, the maximum time interval between the transmission of a request packet and the reception of a response packet, shown in FIG. 1, is predefined; therefore, after the predefined time has elapsed from the reception of the request packet, there is no need to generate a response packet for that request packet. By discarding the request packet accumulated in the packet accumulating means 76, it becomes possible not to process the invalidated request packet. Further, the cycle time register provided in all devices can be used as the time outputting means 74.

The fourth embodiment, the fifth or sixth embodiment, and the seventh embodiment can be used in any combination thereof. In that case, the advantages of reduced amount of processing and effective utilization of a communication medium achieved by the respective embodiments can be further enhanced.

As described above, according to the invention, since the device that transmitted a request packet is prevented from receiving a new request packet while waiting for a response packet, the device need not have the capability to carry out multiple processes. This makes it possible to reduce the capacity of the packet accumulating means needed for packet reception and processing. Furthermore, even if the capacity of the accumulating means needed for packet reception is small, the possibility of retransmission can be reduced that occurs because of the reception of a response packet when the accumulating means is in use for reception of another request packet. This ensures more reliable reception of the response packet.

According to the invention, since the device that transmitted a request packet is prevented from receiving a new request packet while waiting for a response packet, the device need not have the capability to carry out multiple processes. This makes it possible to reduce the capacity of the packet accumulating means needed for packet reception and processing. Furthermore, even if the capacity of the accumulating means needed for packet reception is small, the possibility of retransmission can be reduced that occurs because of the reception of a response packet when the accumulating means is in use for reception of another request packet. This ensures more reliable reception of the response packet.

According to the invention, the accumulating means for reception of normal packets and the accumulating means for reception of particular packets are provided separately. This ensures more reliable reception of particular packets which, in most cases, are used for transmission of important information.

According to the invention, by using the receive time of a request packet when generating a response packet, generation and transmission of an invalid response packet can be prevented when a predefined time has elapsed from the reception of the request packet.

According to the invention, by allowing the transmitting means to know the time at which a request packet was received, the generation of a response packet that would be rendered invalid if transmitted, by arbitration, etc. with the transmitting medium when transmitting a response packet, can be prevented when a it predefined time has elapsed from the reception of the request packet. Furthermore, by not transmitting an unnecessary packet onto the transmission medium, the bandwidth of the transmission medium can be prevented from being wasted, and the transmission medium can thus be utilized efficiently.

According to the invention, by using the time elapsed from the reception of a request packet when generating a response packet, generation and transmission of an invalid response packet can be prevented when a predefined time has elapsed from the reception of the request packet.

According to the invention , when a predefined time has elapsed from the reception of a request packet, the request packet, if remaining unprocessed in the packet accumulating means, is discarded. This eliminates the time-wasting processing of reading out the request packet from the packet accumulating means.

What is claimed is:

1. A packet transmitting/receiving apparatus comprising:

packet receiving means for receiving and outputting a packet;

normal packet accumulating means for temporarily accumulating a packet for which a retransmission request can be made;

particular packet accumulating means for temporarily accumulating a packet for which a retransmission request cannot be made;

packet selecting means for receiving the received packet from said packet receiving means, and writing said received packet either to said normal packet accumulating means or to said particular packet accumulating means, depending on whether or not said received packet is a packet for which a retransmission request can be made, and for directing a retransmission of said received packet when said received packet is a packet for which a retransmission request can be made, and when said packet is received while said normal packet accumulating means is in use; and retransmission requesting means for requesting a retransmission of said packet based on the direction of said packet selecting means.

2. A packet transmitting/receiving apparatus according to claim 1, wherein when a packet for which a retransmission request can be made is received from said packet receiving means, and when directing a retransmission of said received packet, said packet selecting means discards said received packet.

3. A packet transmitting/receiving apparatus according to claim 1, wherein when a packet for which a retransmission request cannot be made is received from said packet receiving means, and when said particular packet accumulating means is in use, said packet selecting means discards said received packet.

4. A packet transmitting/receiving apparatus comprising:

packet receiving means for receiving and outputting a packet;

packet accumulating means for temporarily accumulating the received packet received by said packet receiving means;

time outputting means for outputting a time;

receive time holding means for accepting said time from said time outputting means, and for holding a write time at which said received packet was written to said packet accumulating means by said packet receiving means;

response packet generating means for., when said received packet needs a response packet corresponding thereto, generating said response packet based on said received packet accumulated in said packet accumulating means, said write time held in said receive time holding means, and said time output from said time outputting means, and outputting said generated response packet; and packet transmitting means for transmitting said response packet;

wherein said response packet generating means outputs said response packet only when the time input from said time outputting means is earlier than a time obtained by adding a predetermined value to said write time.

5. A packet transmitting/receiving apparatus comprising:

packet receiving means for receiving and outputting a packet;

packet accumulating means for temporarily accumulating the received packet received by said packet receiving means;

time outputting means for outputting a time;

receive time holding means for accepting said time from said time outputting means, and for holding a write time at which said received packet was written to said packet accumulating means by said packet receiving means;

response packet generating means for, when said received packet needs a response packet corresponding thereto, generating said response packet by reading out said received packet accumulated in said packet accumulating means and said write time held in said receive time holding means, and outputting said generated response packet and said write time; and packet transmitting means for accepting said time from said time outputting means and said response packet and said write time from said response packet generating means, and for transmitting said response packet only when the time at which the transmission is made is not later than a time obtained by adding a predetermined value to said write time.

6. A packet transmitting/receiving apparatus comprising:

packet receiving means for receiving and outputting a packet;

packet accumulating means for temporarily accumulating the received packet received by said packet receiving means;

time outputting means for outputting a time;

measuring means for accepting said time from said time outputting means, and for measuring and outputting a time elapsed after said received packet was written to said packet accumulating means by said packet receiving means;

response packet generating means for, when said received packet needs a response packet corresponding thereto, generating said response packet based on said received packet accumulated in said packet accumulating means and said elapsed time output from said measuring means, and outputting said generated response packet; and packet transmitting means for transmitting said response packet;

wherein said response packet generating means outputs said response packet only when said elapsed time is less than a predetermined value.

7. A packet receiving apparatus comprising:

packet receiving means for receiving and outputting a packet;

packet accumulating means for temporarily accumulating the received packet received by said packet receiving means;

time outputting means for outputting a time;

measuring means for accepting said time from said time outputting means, and for measuring and outputting a time elapsed after said received packet was written to said packet accumulating means by said packet receiving means; and elapsed time monitoring means for, when said packet needs a response packet corresponding thereto, monitoring said elapsed time being output from said measuring means and, if said elapsed time exceeds a predefined time, discarding said received packet accumulated in said packet accumulating means.

8. An apparatus for receiving a request packet from the transmission medium and for transmitting a corresponding response packet onto a transmission medium, said apparatus comprising:

receiving means for receiving the request packet from the transmission medium;

accumulating means for storing the request packet upon receipt by the receiving means;

timing means for determining a storing time at which the request packet was stored by said accumulating means;

generating means for producing the response packet when the corresponding request packet has been stored; and transmitting means for transmitting the response packet onto the transmission medium when a time for transmission is less than a sum of the storing time and a predetermined time-out value.

* * * * *

UNITED STATES PATENT AND TRADEMARK OFFICE

CERTIFICATE OF CORRECTION

PATENT NO. : 6,483,845 B1 Page 1 of 1
DATED : November 19, 2002
INVENTOR(S) : Takeda et al.

It is certified that error appears in the above-identified patent and that said Letters Patent is hereby corrected as shown below:

Title page,
Item [73], “Bandhoven” should read -- Eindhoven --.
Item [56], References Cited, U.S. PATENT DOCUMENTS, insert
-- 5,052,029 9/1991 James et al. 375/356 --.

Signed and Sealed this

Twenty-second Day of July, 2003

JAMES E. ROGAN
*Director of the United States Patent and Trademark Office*